March 3, 1931.  A. K. SMITH  1,794,479
METHOD OF PITTING FRUIT
Original Filed July 28, 1926   3 Sheets-Sheet 1

Inventor
Albert K. Smith
By his Attorneys
Stockbridge & Borst

March 3, 1931. A. K. SMITH 1,794,479
METHOD OF PITTING FRUIT
Original Filed July 28, 1926 3 Sheets-Sheet 2
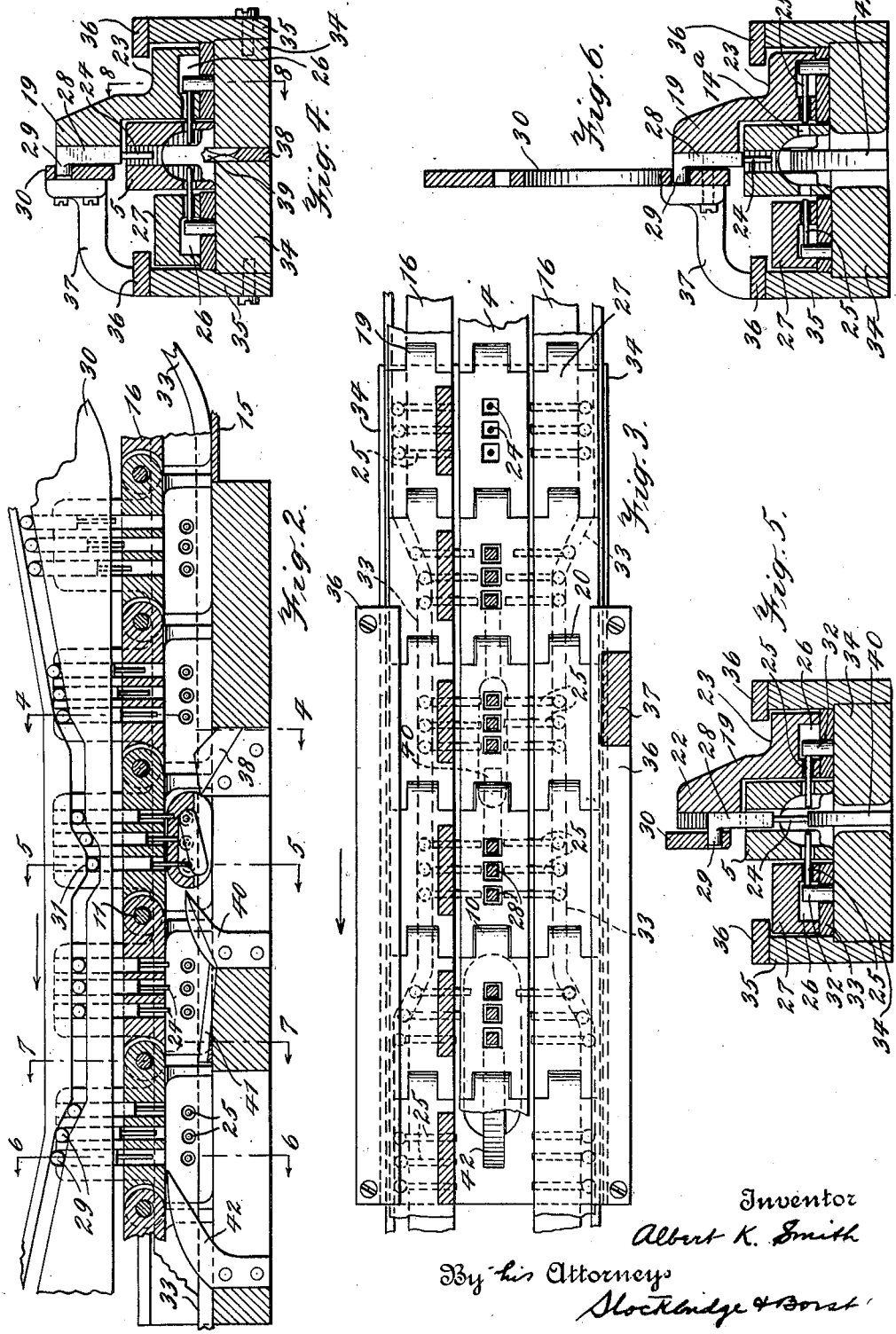
Inventor
Albert K. Smith
By his Attorneys

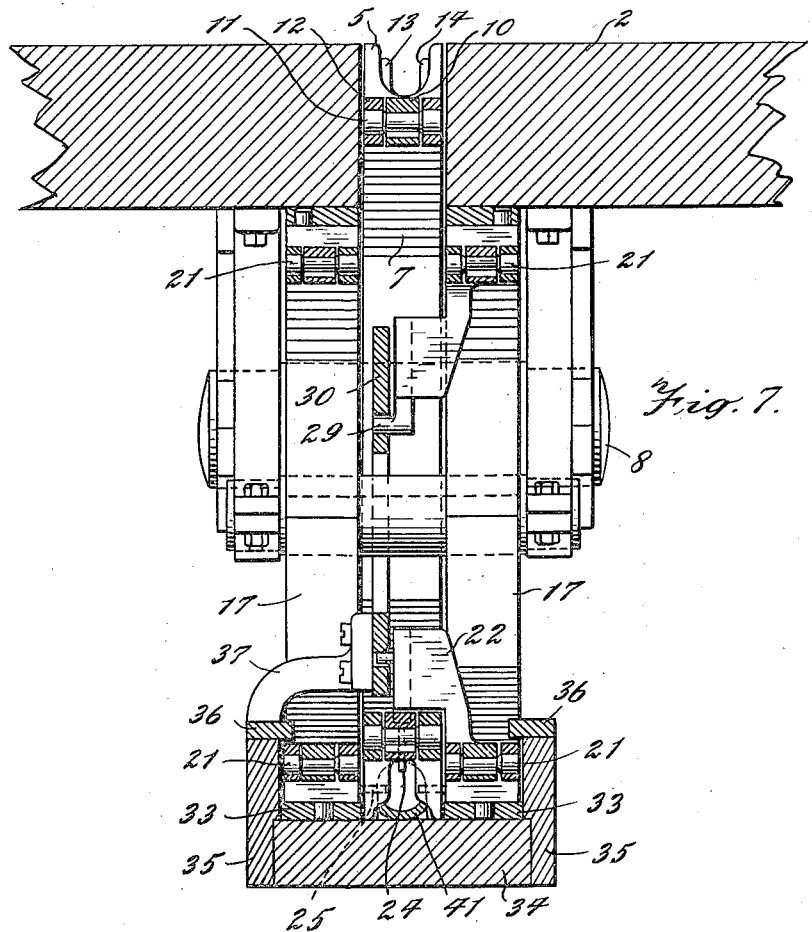
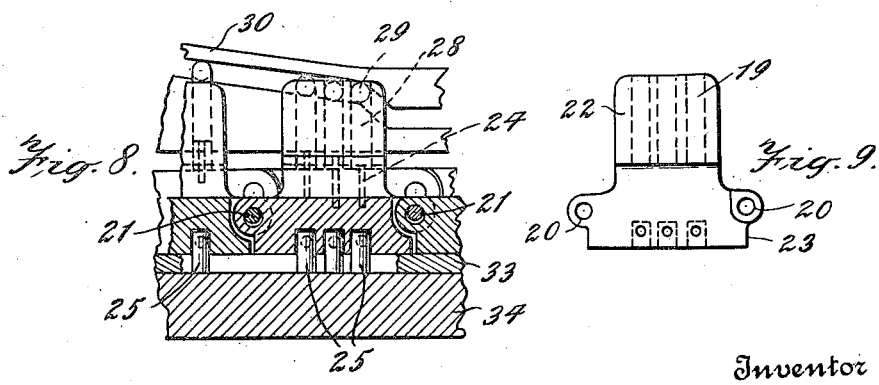 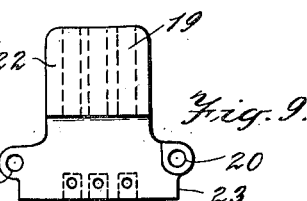

Patented Mar. 3, 1931

1,794,479

UNITED STATES PATENT OFFICE

ALBERT K. SMITH, OF WEST ORANGE, NEW JERSEY, ASSIGNOR TO THE HILLS BROTHERS COMPANY, INC., A CORPORATION OF NEW YORK

METHOD OF PITTING FRUIT

Original application filed July 28, 1926, Serial No. 125,358. Divided and this application filed November 24, 1926. Serial No. 150,412.

This invention relates to methods of pitting fruits and more particularly to pitting dates, which are particularly difficult to pit due to their sticky nature and non-uniformity of position of the seeds within the date, and is a division of my co-pending application, Serial No. 125,358, filed July 28, 1926. Attempts have been made in the past to remove the seed by pushing it longitudinally from one end and out the other end. Such a process has the disadvantages of being uncertain, because the position of the seed varies in different dates, of being very wasteful, because in pushing the seeds out some meat of the fruit is always extracted with the seeds, and of being relatively slow because the fruit is held stationary while the stone is being ejected and therefore the seeding operation is intermittent.

It is the purpose of this invention to construct a machine that will extract pits from dates continuously and economically and to accomplish this purpose this invention contemplates slitting the dates longitudinally and extracting the pits from the side of the fruit through the slits.

As an aid in removing the pits it is proposed to hold the dates and definitely position the pits within the dates.

An object of this invention is to take dates as they are shipped in bulk, remove the pits and prepare them for stuffing with an artificial filling to take the place of the seed, if so desired, without wasting any meat of the fruit.

Other objects will appear from a further consideration of the description and the drawings which illustrate one embodiment of a means for performing this invention.

Fig. 2 is an enlarged fragmentary detail partly in section showing the vertical positioning pins;

Fig. 3 is a plan view partly in section of the portion of the machine shown in Fig. 2;

Fig 4 is a section taken on line 4—4 of Fig. 2;

Fig. 5 is a section taken on line 5—5 of Fig. 2;

Fig. 6 is a section taken on line 6—6 of Fig. 2;

Fig. 7 is an enlarged section taken on line 7—7 of Fig. 2;

Fig. 8 is a section taken on line 8—8 of Fig. 4, and

Fig. 9 is a side elevation of a link of the auxiliary chain.

Figure 1:
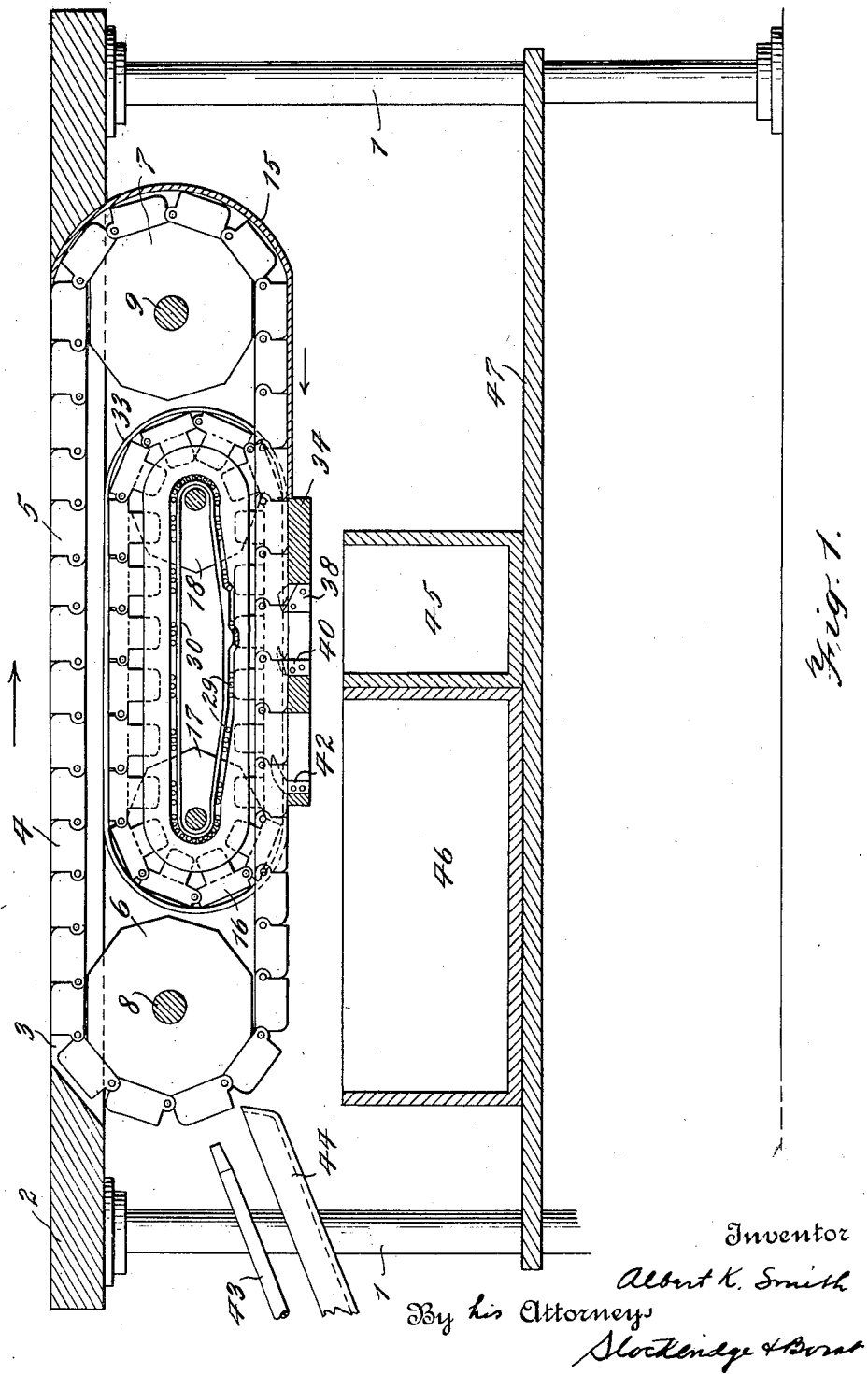
Fig. 1 is a side elevation partly in section of a machine made in accordance with this invention.

In order to clearly present the method involved in this invention, a machine will be described which is adapted to carry out the steps in the proper sequence.

The machine is supported upon four legs 1 on top of which is mounted a table 2 having a centrally disposed opening 3 within which the upper stretch of a continuous link conveyor 4 travels. This conveyor serves as a means for feeding the dates to a series of operating tools for extracting the pit and is composed of a series of interconnected links 5 which encircle and travel over two sprockets 6, 7 secured to two shafts 8, 9, supported by the table one at each end of the opening 3. The shafts may be driven by any convenient source of power (not shown) to cause the conveyor to be moved in a direction indicated by the arrows. The shaft may be mounted and adjusted so as to bring the upper stretch of conveyor links within the opening 3 and flush with the top of table 2. Each link 5 serves as a compartment for one date and is substantially U-shaped in cross-section, the date fitting snugly within the concave recess of the link. At one end of each recess there are two shoulders 13 and 14 projecting into the recess to act as stops and position the date, there being sufficient space between the shoulders to permit entry of the operating tools later to be described. One end of each link is constructed with a single lateral extension 10 bored to receive a connecting pin 11 and the opposite end is formed with bifurcated extensions 12 to receive the single extension of the adjoining link and is also bored to receive a connecting pin 11. To provide for easy replacement of the links the pin 11 is made with its central portion having a smaller diameter than its end portions thereby allowing the single extensions of the links to drop a little below the bifurcated extensions thereby engaging the shoulder of the pin and preventing any axial movement thereof. To change a link it is only necessary to lift one link until all the holes are in alignment, push out the pin, substitute a new link and replace the pin. Such a structure eliminates any end securing means for the pins, see Fig. 7.

The three walls of each conveyor link 5 are drilled as at 14a to allow pit centering pins carried by an auxiliary chain to pass through the links and penetrate the dates definitely centering the seeds therein.

A curved guard 15 is placed around the retreating end and a portion of the lower stretch of the conveyor to retain the dates in the conveyor as the links turn under and traverse the lower stretch between pulleys 6 and 7.

Cooperating with the lower stretch of the conveyor is an auxiliary chain 16 which carries the pit centering pins which locate and definitely center the pits of the dates before the dates are operated upon by any of the operating tools later described. This chain is composed of two parallel series of links carrying vertical and horizontal pit centering pins and travels over two sprockets 17, 18 positioned within the enclosure of the conveyor 4 and is so adjusted that the lower stretch of the chain will be directly over the lower stretch of the conveyor. The chain is driven at the same speed as the conveyor and may conveniently be driven from the same source of power (not shown).

One of the series of links comprising the link carrying chain is composed of links 19 interconnected by means of extensions 20 and pin 21 in a manner similar to the way in which the conveyor links 5 are connected so that they are also readily replaceable. Each of the links 19 are designed with a horizontal portion 22 which extends across the top of the conveyor link as the chain overlies the conveyor and a lower portion 23 extending along one side of the conveyor link. The upper portion 22 is channeled to receive three vertical pit centering pins 24 and the lower portion 23 is drilled to receive three horizontal pit centering pins 25 and is also channeled to provide a passageway 26 for the enlarged heads of the horizontal pins.

The other series of links 27 comprising the pin chain is composed of links 27 interconnected in the same manner as the other links heretofore described. These links 27 are substantially rectangular in cross-section and lie along the opposite side of the conveyor links to that occupied by links 19. The lower portions of these links are drilled and channeled similar to the lower portion 23 of links 19 to receive three horizontal pit centering pins 25.

The vertical pit centering pins 24 which are also used to initiate the pit extraction as well as assist in centering the pit may conveniently be constructed of short stubs of piano wire (which ends penetrate the date) secured in larger square shank portions 28 which slide in the links and which have laterally extending projections 29 adapted to engage in a vertical elliptical cam track 30 supported between the upper and lower stretches of the pin carrying chain. This track controls the vertical movement of the pins 24 in the channeled ways of links 19 through the engagement of the head of the pin in the track. The cam track or groove approaches closer to the links during the lower stretch of the chain and as the chain links traverse the lower stretch and surround the conveyor links the vertical pins are moved downwardly by the drop in the track, penetrate the dates and vertically center the pits. As the track approaches substantially the center of the lower stretch the track takes a decided dip as at 31 and then retreats upwardly again. This dip in the track causes the pins 24 to be projected downwardly and thereby strike the pit and push it downwardly and partially out of the date thereby initiating the pit extraction.

The horizontal pit centering pins 25 carried by both links of the chain may also be conveniently constructed from fine stiff wire such as piano wire and are securely held in larger head portions 32 adapted to slide in the channeled passages of the links. The heads 32 of the pins 25 project below and beyond the links and engage in horizontal cam tracks 33 situated below the two links, and surrounding the pin carrying chain. These tracks control the horizontal position of the pins throughout the entire length of the chain. During the under stretch of the chain and conveyor these tracks converge toward the conveyor links and cause the horizontal pins to move inwardly and thereby horizontally center the pits.

During the inward and downward movement of the three sets of pins the two side links carrying the centering pins must be moved simultaneously with the conveyor links in such relative positions that the pins carried by the side links will exactly register with the holes in the conveyor links. In order to be sure that the necessary close, intimate relationship is maintained between the chain links and the conveyor links the links are made to pass between guide members. A bed plate 34 is positioned under the conveyor links to contact with the bottom of the conveyor links and the bottom of the cam tracks 33 thus forming a lower guiding surface for the conveyor links. Side guide members 35 are secured to the bed plate and extend upwardly therefrom to prevent any side swing of the links, and top guards 36 are bolted to the side guide members to prevent any movement of the links in an upward direction The links are thereby held and guided on all four sides so that they are necessarily restricted to a close sliding fit in correct position for registration of the pins and apertures.

An elbow bracket 37 is secured to the top guard and in turn supports the vertical cam track.

The bed plate 34 carries the four operating tools, namely the slitting and spreading knife, the pit extractor, the date re-former, and the date ejector. Situated near one end of the bed plate and extending upwardly through a centrally disposed slot in the plate directly below the center of the conveyor link is a slitting knife 38 which slits the dates longitudinally as they are carried by the moving conveyor over the edge of the knife. The retreating edge of the knife is thickened as at 39 to spread the slit edges of the dates apart to permit easy entry of the pit ejector into the dates. Secured to the bed plate rearwardly of the knife at the retreating edge of a large discharge aperture in the bed plate is a pit ejector 40 which has an arcuate pointed or finger-like projection which extends into the slitted dates above the seeds and extracts the seeds as the dates continue to travel with the conveyor, discharging the seeds through the opening in the bed plate into a suitable receptacle. Immediately to the rear of the pit ejector and attached to the bed plate is a date re-former 41 consisting of a concaved strip (Figs. 2 and 7) longitudinally inclined upwardly so the extremity extends somewhat into the recesses of the conveyor links, which functions to re-form the slit dates to their original shape by pressing the spread edges together as the dates pass over the strip. Rearwardly of the re-former is a date extractor 42 secured to the retreating edge of another discharge opening in the bed plate. The date extractor is similar in shape to the pit extractor being in the nature of a curved finger and extends into the bottom of the conveyor links in order to get behind the re-formed dates and eject them from the conveyor.

Any suitable means for cleaning the conveyor links may be employed such as a steam jet indicated at 43 with a trough 44 positioned below to catch the drippings.

Below the discharge openings in the bed plate are two receptacles 45, 46 mounted upon a tray or shelf 47 supported by legs 1 for the purpose of receiving the pits and dates respectively as they are ejected from the conveyor.

The method involved in the operation of the machine is as follows: The operator places the dates into the links 5 of the conveyor 4 as the upper stretch of the conveyor passes through opening 3 in table 2. The traveling conveyor carries the dates around to the lower stretch of the conveyor, the dates being held therein by the guard 15. As the conveyor leaves sprocket 7 and traverses the lower stretch the pin carrying links of the co-operating chain surround three sides of the conveyor links and cam tracks 33 cause the horizontal centering pins to move inwardly and center the pits of the dates horizontally. Simultaneously the vertical cam track 30 causes the vertical centering pins to move downwardly and center the pits vertically. As the links carry the dates past the slitting and spreading knife 38 the knife slits the dates longitudinally and also spreads the cut edges outwardly. As the dates leave the knife a further depression in the vertical cam track 30 causes the vertical pins to move farther downwardly and thereby push the seeds partially out of the dates immediately after which the vertical pins are partially withdrawn. At this point the pit ejector enters the spread slit of the dates and extracts the partially dislodged pits the pins acting as guides and guiding the pit as it is ejected, discharging them through the opening beneath the ejector and into the receptacle 45. As the date continues to traverse the lower stretch of the conveyor the re-forming tool 41 forces the spread edges of the dates together to their original positions and the centering pins are withdrawn by the cam tracks after which the date ejector 42 enters the conveyor and extracts the re-formed dates discharging them into the receptacle 46. As the conveyor links progress upwardly around sprocket 6 they are washed by a jet of steam so that any sticky or gummy substance is removed before the links again traverse the upper stretch of the conveyor to be refilled by the operator.

I claim:

1. The method of removing pits from fruit consisting in centering the pit within the fruit, longitudinally slitting the fruit, ejecting one end of the pit through the slit and thereafter extracting the entire pit from the fruit.

2. The method of removing the pits from fruit consisting in positioning the pit within the fruit, longitudinally slitting the fruit and ejecting one end of the pit from the fruit and then removing the entire pit from the fruit.

3. The method of extracting pits from fruit, which comprises supporting the fruit, engaging the pit from opposite directions and thereby centering it, and engaging and forcing the centered pit from the fruit.

4. The method of extracting pits from dates which comprises supporting a date, applying pressure to the pit from opposite directions and moving the pit within the date to center it, engaging the centered pit at one end, and moving the pit and date relatively to force the pit from the date.

In witness whereof, I hereunto subscribe my signature.

ALBERT K. SMITH.